April 14, 1953 — L. VAHEY ET AL — 2,634,858
PNEUMATIC SEPARATOR OR CLASSIFIER
Filed Nov. 7, 1950 — 2 SHEETS—SHEET 1

Inventors
L. Vahey
C.H.J.V. Phillips
By Glaser & Downing Siebbl Attys.

April 14, 1953   L. VAHEY ET AL   2,634,858
PNEUMATIC SEPARATOR OR CLASSIFIER
Filed Nov. 7, 1950   2 SHEETS—SHEET 2

Inventors
L. Vahey
C.H.J.V. Phillips

Patented Apr. 14, 1953

2,634,858

UNITED STATES PATENT OFFICE 2,634,858

PNEUMATIC SEPARATOR OR CLASSIFIER

Llewellyn Vahey, Birmingham, and Cyril Henry John Vezey Phillips, Solihull, near Birmingham, England Application November 7, 1950, Serial No. 194,416
In Great Britain November 28, 1949

8 Claims. (Cl. 209—20)

This invention has for its object to provide improved means for separating extraneous substances from granular, powdered or like materials, for example the separation of stones, grit or other foreign matter from wheat or other grains; or for grading, or sorting such materials.

The invention consists in means for separating extraneous substances from granular, powdered or like material comprising, in combination, a substantially vertical duct with means for delivering the material into the upper part of said duct, a perforated screen extending partly across the duct from one side thereof at a position part way up the duct, an outlet from said duct in the said side at a position above the said screen, an inclined baffle extending from said outlet to a short distance from said screen, a settling chamber beyond said outlet, means delivering material on to said screen, means causing air to flow (1) through the material as it passes on to said screen to carry some of it into said chamber, some on to said baffle and allowing some to fall on to said screen, and (2) through the screen and between the screen and baffle to remove lighter material from the screen and from material falling from the baffle on to the screen and means delivering from the screen any material that remains thereon.

The invention further comprises separating means in which the baffle is perforated so that air passes through it and also between its lower edge and the screen below.

The invention further comprises a perforated feed screen through and beneath the lower edge of which air passes, and which feeds material on to the other screen.

The invention further comprises an air inlet beneath the screen or screens in the side of the duct opposite to that in which the outlet is situated and an adjustable baffle opposite said inlet to direct incoming air upwards against the screen or screens.

The invention further comprises a second adjustable air inlet to the duct at a position behind the upper perforated screen.

Figure 1:
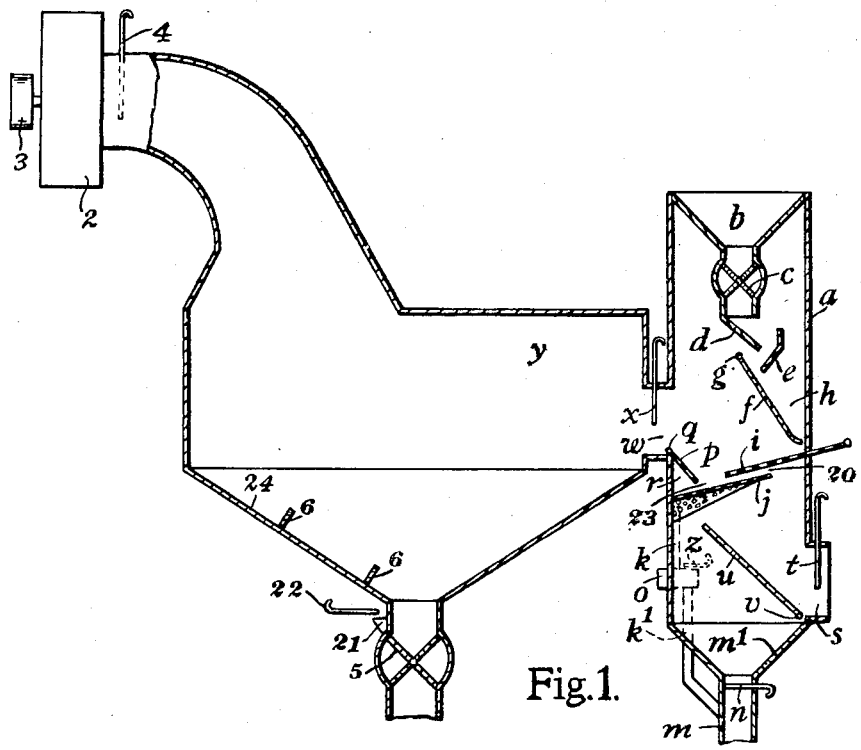
Figures 1–8 are diagrams illustrating different embodiments of the invention.

In carrying the invention into effect as shown in Figure 1, for separating stones or other foreign matter from grain, there is provided a vertical duct $a$ which may be of rectangular cross section, and at the upper end of the duct is arranged a hopper $b$ for containing the material to be treated. A rotary delivery valve $c$ at the base of the hopper forms an air seal of known form through which the material is fed to the duct. Beneath the valve are arranged a pair of deflector plates $d$, $e$ for directing the material on to an obliquely arranged spreader plate $f$ of substantially the same width as the duct, the spreader plate being angularly adjustable about a pivot-axis $g$ situated at or near its upper edge. The spreader plate forms with the adjacent side of the duct what is virtually a sub-hopper $h$ having a narrow adjustable discharge opening at its lower end. If desired the material may be fed direct from the valve $c$ on to the spreader plate $f$.

At a short distance below the lower end of the plate $f$ are arranged a pair of perforated screens $i$, $j$. These are disposed transversely across the duct and are inclined at an angle to the horizontal, about 8° being convenient, the direction of inclination being downwardly from the end which receives the material. The screen $i$ projects from one side of the duct and the other screen $j$ from the other side, so that they overlap at the centre of the duct. The amount of overlap may be adjustable by arranging the screen $i$ to be slidable through the adjacent side of the duct. Also the two screens are separated by a convenient amount to form between them a clear narrow passage 20 which may be adjustable by raising or lowering the upper screen $i$.

The upper screen $i$ is flat, and so is the portion of the lower screen $j$ which forms the underside of the said passage 20, but the remainder of the lower screen is either shaped to the form of a shallow V or is flat and inclined transversely to enable material gathered thereon to gravitate across this portion of the screen to one side thereof or is flat and has a worm or conveyor to deliver material therefrom. When shaped to an inverted V-form as shown (see Figure 9), a vertical collecting duct $k$ is provided at each of the opposite edges of the screen $j$. If the screen $j$ is of V form, a single duct $k$ is arranged at the point of the V to which material will gravitate. When the screen $j$ is flat and is inclined transversely, the duct $k$ is arranged at its lower end. The duct $k$ extends to an observation box $o$ fitted with a draught control slide $z$. An exit duct $k^1$ leads from the bottom of $o$ to a discharge spout $m$. The spout $m$ extends downwardly from the lower end of a collecting hopper $m^1$ at the lower end of the duct $a$, and is controlled by a slide $n$ or a rotary valve which is adapted to form an air seal, and through the medium of which any material which may collect in the base of the duct, can be discharged.

Above the lower part of the screen $j$ is arranged a perforated and angularly adjustable baffle $p$ pivotally supported at $q$, which baffle forms with the adjacent part of the duct $a$ and screen $j$, what we term a swirl chamber $r$, which will be hereinafter referred to.

At the side of the main duct $a$ opposite to that at which the part $p$ is located and beneath the screens $i$ and $j$, there is provided an air inlet $s$ controlled by a shutter $t$. An obliquely mounted air deflecting plate $u$ situated opposite the inlet $s$ serves to direct the incoming air stream upwardly to the screens $i, j$. The deflecting plate $u$ is supported at its lower edge by a pivot $v$ and is angularly adjustable.

At the opposite side of the duct from the air inlet $s$, and at a position above but adjacent to the swirl chamber $r$, there is provided an air outlet $w$ controlled by a shutter $x$. The opening $w$ leads to a reception chamber $y$ and in association with the reception chamber, any convenient means, such as an induction fan 2 (driven by an electric motor 3 or other means), is provided for inducing the required air flow through the system. The inlet to the fan may be controlled by a shutter 4. At its lower end the reception chamber is provided with a rotary isolating valve 5 forming an air seal and controlling the outflow of the collected material. Above the valve 5 may be provided a subsidiary air inlet 21 fitted with a control slide 22. Both valves $c$ and 5 are preferably interconnected for simultaneous operation by chain and sprocket or other gearing to prevent the machine becoming blocked with material during service.

The arrangement is such that when in action, the screens $i$ and $j$ together form a device for distributing the air flow in an even and controlled manner across the whole duct, thus enabling full advantage to be taken of the difference in specific gravity and air resistance of the materials being treated for the purpose of their separation. The screens do not of themselves effect any separation of material, though some material may pass therethrough, because the air flowing through the screens causes material thereon which is not heavy enough to travel down to the delivery ducts $k$, to float or be more or less buoyant in their passage over the screens. The material falls at a regulated rate on to the upper end of the screen $i$ and floats in a thin and even layer over the upper surface towards the lower edge of the screen $i$, due to the air currents passing through the perforations in the screen. Any very light material mixed with the general mass is separated and carried from the screen $i$ direct through the opening $w$ to the chamber $y$. The material reaching the lower end of the screen $i$ is caught by the transverse air stream flowing freely through the opening 20 between the overlapping parts of the screens in conjunction with the curents of air rising through lower screen $j$ and this transverse air stream sweeps the material towards the opening $w$. If the material has a high specific gravity it will fall on to the screen $j$ or baffle $p$ but lighter material will pass clear of and above the baffle on to the walls of the chamber $y$ from which it will gravitate into the base of the chamber. A window in the wall of the chamber enables the material delivered therein to be inspected. It will be appreciated that there is a concentrated air flow through the openings $w$ and 20, whereas the relatively calm conditions in the chamber enable the bulk material to deposit in such chamber.

With regard to the material which arrives on the baffle or platform $p$, this is kept in a state of flotation by the air drawn through the perforations in the baffle. If the material does travel to the base of the baffle, it comes under the influence of the strong air current which issues through the gap 23 between the lower end of the baffle $p$ and the upper surface of the screen $j$. This ensures that no lighter material avoids being carried forward by the air currents into the chamber $y$. The heavier material gradually passes into the space $r$ beneath the baffle $p$ but it is continually subjected to air currents (which will separate and carry forward through the gap 23 to the chamber $y$ any lighter material which may accidentally get into the chamber $r$). Finally the heavier material passes into a discharge duct $k$ and then passes into an observation box $o$ which is made completely or partly of transparent material. The air control slide $z$ on such box allows sufficient air to pass into the duct $k$ to ensure a gravitational discharge of the heavier material down the duct and to prevent any lighter material from entering the duct. It will be appreciated that if too rapid a rate of air flow up a duct $k$ occurred, it would be difficult, if not impossible, to get the material to enter the duct and drop into the box $o$.

The left-hand side 24 of the base of the chamber $y$ upon which the major portion of the material deposits, is fitted with baffles 6 which form pockets from which the material cascades into the valve 5 where it may receive a final aspiration in passing the air stream entering at 21. The lighter material is carried by the main stream of air out of the chamber $y$ and through the fan 2 for subsequent separation in a cyclone or by other known means.

Whilst the apparatus above described is more particularly intended for separating foreign matter from wheat or other grains, it may be used for the separation of other mixed granular materials.

Figure 2:
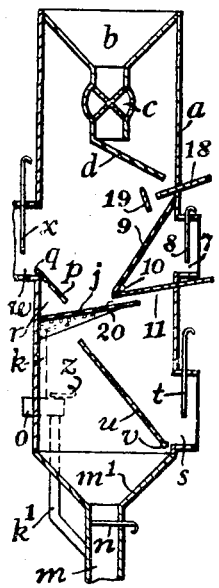

For the grading or sorting of powdery material, the modification shown in Figure 2 may be advantageously employed, according to which air is admitted not only through the main inlet $s$, but also above the screen $j$ through an opening 7 adjustable by a shutter 8 which extends transversely of the opening 7, this opening being arranged opposite the opening $w$ leading to the reception chamber $y$. Across additional opening 7, there is mounted an adjustable inclined deflecting perforated screen 9, the upper end of which rests freely against the wall of duct $a$, the lower end being pivoted at 10 to a slidably adjustable slide plate 11, which in this case occupies the position of the previously mentioned screen $i$. By adjusting the length of the plate 11 in the duct $a$, the angle of the screen 9 is varied to suit the material under treatment, which is suitably fed on to it by the slidably adjustable deflector 18 and baffle 19. The part of the air stream flowing through the additional opening 7 passes through the deflecting screen 9 carrying with it the lighter material directly to the reception chamber. The rest of the material falls across the gap 20 when it is subjected to a concentrated air current as previously described.

Instead of inducing the required air flow through the system as above described, this air flow may be created by a blower associated with the inlet s to the duct. Also in some cases the extraneous substances, which may then comprise the bulk of the material, may be carried away by the air flow, and the principal material be collected from the screen j down the ducts k.

By the use of this invention the treatment of granular, powdered or like material for such purposes as those above mentioned can be effected in a very efficient and reliable manner.

Figure 3:
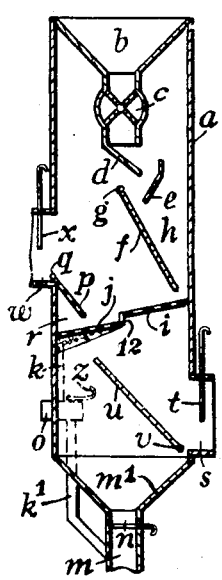
Figure 4:
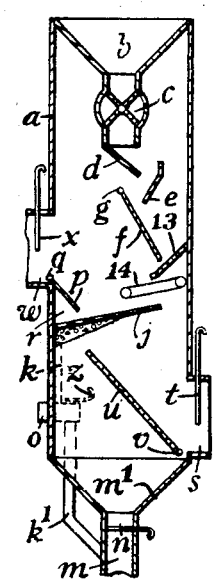
Figure 5:
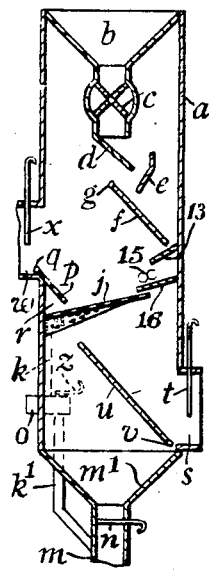
Figure 9:
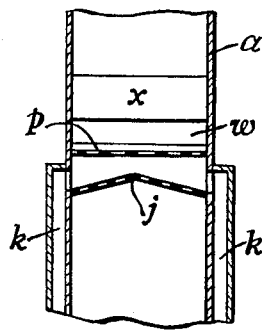
Figure 9 is a detail transverse sectional view showing the location of the ducts through which extracted material passes from the base screen.

Some examples of alternative arrangements will now be described:

All the arrangements shown in Figures 3-7 are essentially similar to that shown in Figures 1 and 9, and the description already given is applicable, subject to the following differences. In Figure 3 the screens i and j form a single unit but there is a gap 12 or a series of gaps in a stepped down part of the one piece member which allows of a concentrated transverse air flow as in the Figure 1 construction. In Figure 4 a deflector 13 is arranged beneath the deflector f, and the screen i is replaced by a small endless conveyor 14 comprising a flexible band carried by end rollers and driven by any convenient means, the material received by the conveyor being discharged therefrom on to the screen j. As shown, the conveyor 14 and screen j are apart and are arranged to overlap. Instead of the conveyor 14, a pair of fluted rollers 15 suitably geared and mounted above a solid screen part 16 may be used as shown in Figure 5. The material is received by the rollers from the deflector 13, and delivered thereby on to the screen j.

Figure 6:
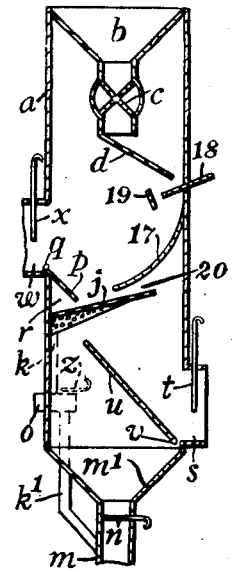
Figure 7:
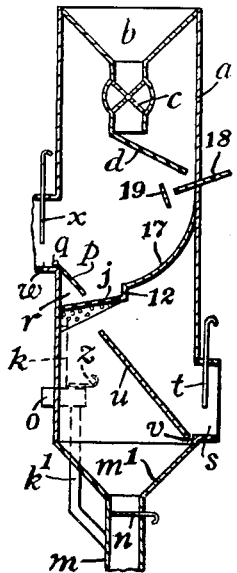

In Figure 6 the screen i is replaced by a solid curved plate 17. Material received from the valve c is delivered on to the plate 17, the lower part of which is spaced from and arranged to overlap the perforated screen as in Figure 1. A modification of this arrangement is shown in Figure 7. In the latter, the plate 17 does not overlap the screen j, and there are gaps 12 in the step between the parts for the transverse air flow, similar to the Figure 3 arrangement.

Figure 8:
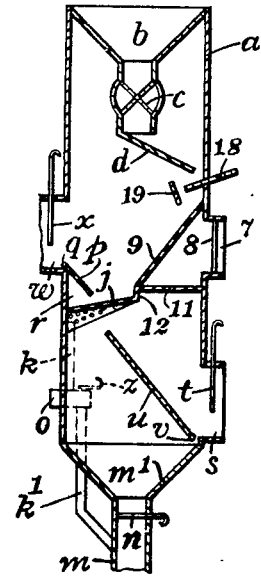

The arrangement shown in Figure 8 is a modification of the arrangement shown in Figure 2, and the above description of Figure 2 is applicable subject to the following differences. In Figure 8, the screens 9 and j do not overlap, and the step between their adjacent ends has gaps or holes therein at 12. In this case the plate 11 is not adjustable and the inclination of screen 9 is fixed.

What we claim is:

1. Means for separating extraneous substances from granular, powdered and like material comprising in combination, a substantially vertical duct with means for delivering the material into the upper part of said duct, a perforated screen extending partly across the duct from one side thereof at a position part way up the duct and inclined upwardly from the side to which it is attached, an outlet from said duct in the said side at a position above the said screen, a downwardly inclined baffle extending from said outlet to a short distance from said screen, a settling chamber beyond said outlet, means extending downwards from the wall of the duct opposite that in which the said outlet is situated to a position above the aforesaid perforated screen delivering material on to said perforated screen, means causing air to flow up the duct (1) through the material as it passes on to said screen from said delivering means to carry some of the material directly into said chamber, some on to said baffle and some on to said screen, and (2) through the screen and between the screen and baffle to remove lighter material from the screen and from material falling from the baffle on to the screen and means delivering from the screen any material that remains thereon.

2. The means claimed in claim 1 in which the inclined baffle is perforated.

3. Means claimed in claim 1 in which the perforated screen and the means delivering material thereon are made integrally with one another with a perforated step at their meeting position.

4. In the means claimed in claim 1, an air inlet beneath the screen in the side of the duct opposite to that in which the outlet is situated and an adjustable baffle opposite said inlet to direct the air upwards against said screen.

5. In the means claimed in claim 4, an upper perforated screen extending partly across the duct from the side opposite to the outlet side and at a higher level than the other perforated screen, with a clearance between the bottom edge of the upper screen and the top of the lower screen and a second adjustable air inlet to the duct at a position in the side of the duct opposite to the side containing the outlet and in the rear of the upper perforated screen.

6. Means for separating extraneous substances from granular, powdered and like material comprising, in combination, a substantially vertical duct, a rotary valve for delivering the material into the top of the duct whilst excluding air, a lower perforated screen extending partly across the duct from one side thereof downwards towards which the screen inclines, the screen being part way up the duct, an upper perforated screen extending partly across the duct from the opposite side thereof and above the other screen with a clearance between the bottom edge of the upper screen and the top of the lower screen, an outlet, with means for its adjustment, in the first mentioned side of the duct in a position above the lower perforated screen, an adjustable inclined perforated baffle extending from said outlet to a short distance from said screen, means delivering material from said lower screen to an in-part transparent box, means regulating the admission of air to said box, a settling chamber beyond said outlet, a valve for delivering any material from the base of the duct, a rotary air seal valve for delivering material from said settling chamber, an air inlet to the duct beneath the said screens in the side of the duct opposite to that in which the outlet is situated, an adjustable baffle opposite said inlet to direct the inlet air upwards against said screens, and means exhausting said settling chamber and causing air to enter by said inlet and pass through the screens and between both the feed screen and the baffle and the lower screen.

7. In means as claimed in claim 6, a second adjustable air inlet to the duct at a position in the rear of the upper screen in the side of the duct opposite to the side containing the outlet, and means preventing air from the first inlet passing behind the upper screen.

8. In the means claimed in claim 1, a screen of inverted V form with delivery ducts extending downwards from its opposite sides.

LLEWELLYN VAHEY.
CYRIL HENRY JOHN VEZEY PHILLIPS.

(References on following page)

References Cited in the file of this patent

UNITED STATES PATENTS

| Number | Name | Date |
|---|---|---|
| 248,885 | Rollins | Nov. 1, 1881 |
| 437,743 | Zeisloft | Oct. 7, 1890 |
| 650,138 | Smith | May 22, 1900 |
| 711,016 | Stebbens | Oct. 14, 1902 |
| 913,377 | Grant | Feb. 23, 1909 |
| 1,579,660 | Reilly | Apr. 6, 1926 |

FOREIGN PATENTS

| Number | Country | Date |
|---|---|---|
| 12,746 | Great Britain | 1888 |
| 50,855 | Norway | May 18, 1932 |